US012782047B2

(12) United States Patent
Sakita et al.

(10) Patent No.: US 12,782,047 B2
(45) Date of Patent: Nov. 3, 2026

(54) HOT AIR NOZZLE AND DRYING OVEN

(71) Applicant: Taikisha Ltd., Tokyo (JP)

(72) Inventors: Kenji Sakita, Tokyo (JP); Yukiya Takizawa, Tokyo (JP); Kozo Ishida, Tokyo (JP); Toshihiko Koike, Tokyo (JP)

(73) Assignee: Taikisha Ltd., Tokyo (JP)

( * ) Notice: Subject to any disclaimer, the term of this patent is extended or adjusted under 35 U.S.C. 154(b) by 817 days.

(21) Appl. No.: 18/026,486

(22) PCT Filed: Dec. 28, 2021

(86) PCT No.: PCT/JP2021/048860
§ 371 (c)(1),
(2) Date: Mar. 15, 2023

(87) PCT Pub. No.: WO2023/127120
PCT Pub. Date: Jul. 6, 2023

(65) Prior Publication Data
US 2024/0295360 A1 Sep. 5, 2024

(51) Int. Cl.

| | |
|---|---|
| ***B05B 1/04*** | (2006.01) |
| ***B05B 1/00*** | (2006.01) |
| ***F26B 3/04*** | (2006.01) |
| ***F26B 21/00*** | (2026.01) |
| ***F26B 21/12*** | (2006.01) |
| ***F26B 21/50*** | (2026.01) |

(52) U.S. Cl.
CPC ................ *F26B 3/04* (2013.01); *F26B 21/50* (2026.01); *F26B 2210/12* (2013.01)

(58) Field of Classification Search
CPC ......... F26B 3/04; B26B 21/004; B26B 21/12; B05B 1/00; B05B 1/005; B05B 1/02; B05B 1/044; B05B 1/046; B05B 1/04
USPC .................................... 34/232; 239/523, 592
See application file for complete search history.

(56) References Cited

U.S. PATENT DOCUMENTS

| | | | |
|---|---|---|---|
| 5,823,767 A | 10/1998 | Watanabe et al. | |
| 2019/0344291 A1* | 11/2019 | Vandepitte | B05C 9/06 |
| 2020/0033058 A1 | 1/2020 | Hakata et al. | |
| 2021/0095923 A1 | 4/2021 | Uchida et al. | |

FOREIGN PATENT DOCUMENTS

| | | |
|---|---|---|
| CN | 112074701 A | 12/2020 |
| DE | 102017101336 A1 | 7/2018 |
| JP | 536660 A | 2/1993 |
| JP | 11188303 A | 7/1999 |
| JP | 11290751 A | 10/1999 |

(Continued)

OTHER PUBLICATIONS

English translation of JP404686 by PE2E, Oct. 30, 2025.*

*Primary Examiner* — Deming Wan
(74) *Attorney, Agent, or Firm* — The Webb Law Firm

(57) ABSTRACT

A hot air nozzle includes a leading-end face 2 having an outlet, and at least one side face 3 extending between the leading-end face 2 and a base end 4. The leading-end face 2 has a shape that makes a lengthwise direction α and a widthwise direction of the leading-end face 2 distinguishable, and has a center section 22 in the lengthwise direction α that protrudes relative to two opposite ends 23 in the lengthwise direction α. The outlet extends along the protruding shape of the leading-end face 2.

6 Claims, 6 Drawing Sheets

(56) References Cited

FOREIGN PATENT DOCUMENTS

| | | | | |
|---|---|---|---|---|
| JP | 200070822 | A | 3/2000 | |
| JP | 2004184009 | A | 7/2004 | |
| JP | 4044686 | B2 * | 2/2008 | ............... B05C 9/14 |

* cited by examiner

HOT AIR NOZZLE AND DRYING OVEN

CROSS-REFERENCE TO RELATED APPLICATION

This application is the United States national phase of International Application No. PCT/JP2021/048860 filed Dec. 28, 2021, the disclosure of which is hereby incorporated by reference in its entirety.

BACKGROUND OF THE INVENTION

Field of the Invention

The present invention relates to a hot air nozzle and a drying oven.

Description of Related Art

Painting facilities or the like generally use as equipment for drying a workpiece, a drying oven in which hot air is blown into a booth housing the workpiece to be dried. Commonly used hot air nozzles for blowing hot air into this type of drying oven include those of a slit nozzle type such as that disclosed in JP H9-99263A (Patent Document 1), a pyramid type such as that disclosed in JP H11-290751A (Patent Document 2), and an ejector nozzle type such as that disclosed in JP H11-188303A (Patent Document 3).

PATENT DOCUMENTS

Patent Document 1: JP H9-99263A (or U.S. Pat. No. 5,823,767B)
Patent Document 2: JP H11-290751A
Patent Document 3: JP H11-188303A

SUMMARY OF THE INVENTION

With recent demands for energy conservation, painting facilities are also required to reduce energy consumption. In order to reduce energy consumption in drying ovens in particular, low-temperature curing paints (e.g., paints with a curing temperature of about 100° C.) are increasingly being employed. Low-temperature curing paints generally require precise temperature control in the drying oven, especially uniform heating of the entire workpiece, due to a narrow temperature range suitable for paint baking.

Increasing the flow rate of air circulating in the drying oven is effective for uniformly heating the entire workpiece, but increasing the flow rate itself of hot air discharged from hot air nozzles is not in line with demands for saving energy and therefore not favorable. Research has gone into effectively using the inducing effect of hot air discharged from the hot air nozzles involving surrounding air. However, conventional hot air nozzles such as those of Patent Documents 1 to 3 are not capable of achieving a sufficient inducing effect.

There is a demand to realize a hot air nozzle that makes it easier to exhibit the inducing effect, and a drying oven that includes this hot air nozzle.

A hot air nozzle according to the present invention includes: a leading-end face having an outlet; and at least one side face extending between the leading-end face and a base end, wherein the leading-end face has a shape making a lengthwise direction and a widthwise direction of the leading-end face distinguishable, and has a center section in the lengthwise direction protruding from two opposite ends, in the lengthwise direction, of the leading-end face, and the outlet extends along a protruding shape of the leading-end face.

According to this configuration, hot air is discharged in not only a straight direction parallel to the extension direction of the hot air nozzle, but also directions deviating leftward and rightward from the straight direction. This makes it easier to exhibit the inducing effect.

A drying oven according to the present invention includes: a booth; a support section configured to support a workpiece; and a plurality of hot air nozzles, wherein each of the plurality of hot air nozzles includes a leading-end face having an outlet, and at least one side face extending between the leading-end face and a base end, the leading-end face has a shape making a lengthwise direction and a widthwise direction of the leading-end face distinguishable, and has a center section in the lengthwise direction protruding from two opposite ends, in the lengthwise direction, of the leading-end face, the outlet extends along a protruding shape of the leading-end face, the plurality of hot air nozzles are in at least one nozzle row in which the plurality of hot air nozzles are in a straight line, and the plurality of hot air nozzles are apart from each other while a side face extending in the lengthwise direction, of the at least one side face of each of the plurality of hot air nozzles, opposes the side face extending in the lengthwise direction, of the at least one side face of an adjacent one of the plurality of hot air nozzles in the at least one nozzle row.

According to this configuration, hot air is discharged in not only a straight direction parallel to the extension direction of the hot air nozzle, but also directions deviating leftward and rightward from the straight direction. That is, hot air can be radially discharged relative to the lengthwise direction of the hot air nozzle. Further, the hot air nozzles are apart from each other, and thus the flow path of induced air can be sufficiently secured. These features make it easier to exhibit the inducing effect.

Preferred modes of the present invention will be described below. However, the following examples of preferred modes do not limit the scope of the present invention.

In the hot air nozzle according to the present invention, it is preferable, as one mode, that the leading-end face is a continuously curved face, and the outlet extends along a curved shape of the leading-end face.

According to this configuration, hot air can be discharged while spreading in a fan-shaped area. Thus, a uniform hot air flow can easily be formed.

In the hot air nozzle according to the present invention, it is preferable, as one mode, that the outlet has a width of 5 mm or more and 20 mm or less in a cross-section taken along the widthwise direction.

According to this configuration, the flow velocity of hot air can be easily adjusted in a range in which a favorable inducing effect is exhibited.

In the drying oven according to the present invention, it is preferable, as one mode, that each of the plurality of hot air nozzles is at a position at which the lengthwise direction of the hot air nozzle and an extension direction of a nozzle row to which the hot air nozzle belongs form an angle of more than 0° and less than 90°, and one of the plurality of hot air nozzles is present in an area in the extension direction partially overlapping an area where an adjacent one of the plurality of hot air nozzles is present in the extension direction.

According to this configuration, areas into which hot air is discharged from adjacent hot air nozzles overlap. This enables the workpiece to be continuously exposed to hot air.

In the drying oven according to the present invention, it is preferable, as one mode, that the booth has a bottom face demarcating a bottom section of the booth, a side wall face demarcating a side face of the booth, and an inclined face extending between the bottom face and the side wall face, and the plurality of hot air nozzles extend from the inclined face.

According to this configuration, hot air can be intensively blown to a lower section of a workpiece (e.g., a vehicle bottom and a lower section of a door when the workpiece is a body of a vehicle) where the temperature tends to be unlikely to increase, and this part can easily be heated.

It is preferable, as one mode, that the drying oven according to the present invention further includes at least one baffle extending inward of the booth.

According to this configuration, it is easy to prevent a swirling flow and keep exposure of the workpiece to hot air uniform.

Further features and advantages of the present invention will become more apparent through the description of the following illustrative and non-limiting embodiments with reference to the drawings.

DESCRIPTION OF THE INVENTION

An embodiment of a hot air nozzle and a drying oven according to the present invention will be described with reference to the drawings. The following description of the embodiment of the invention will take, as an example, a drying oven 100 used in a paint facility for a body B of an automobile, and hot air nozzles 1 installed in the drying oven 100.

Summary of Embodiment

Figure 1:
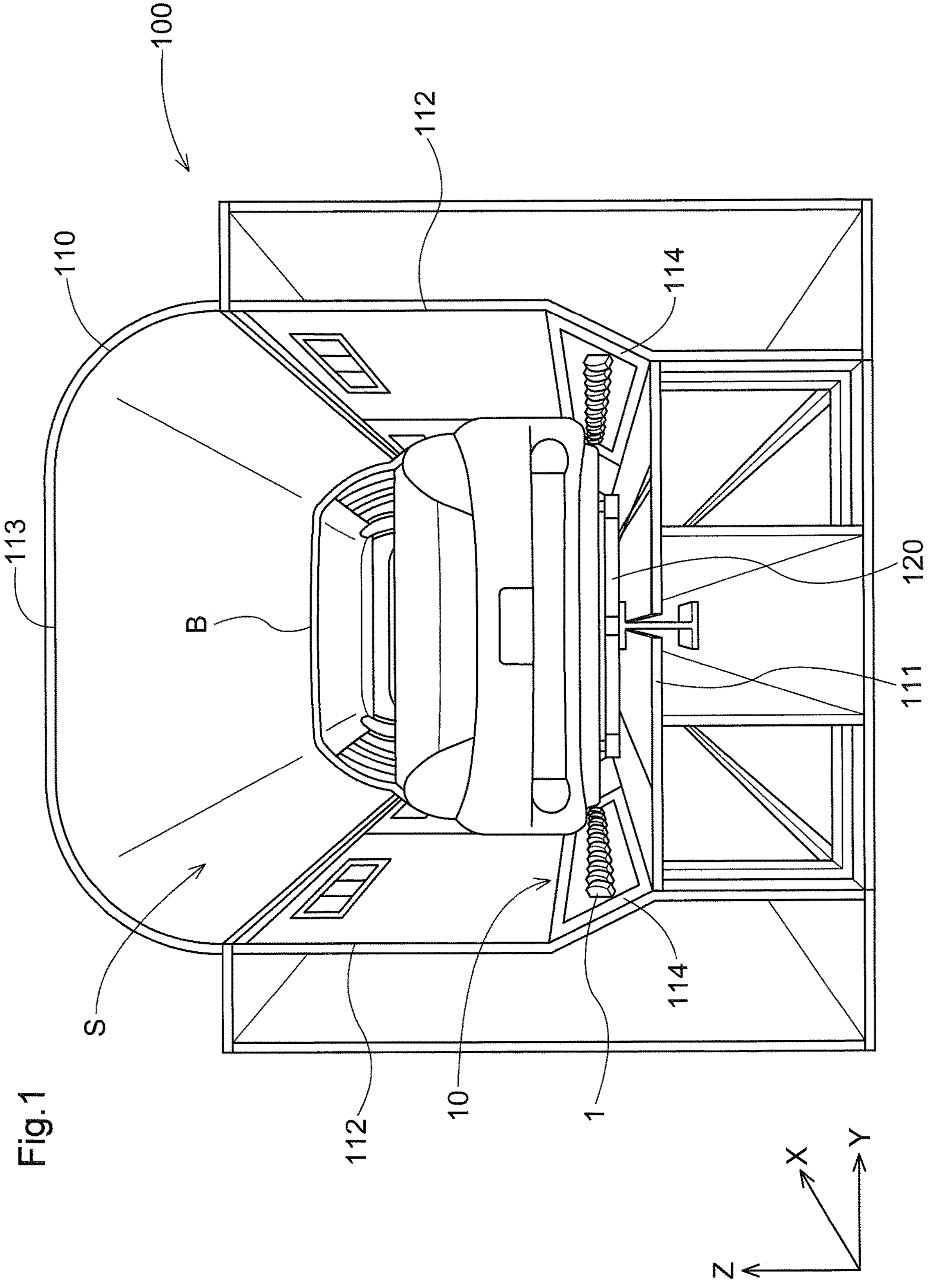
FIG. 1 is a perspective cross-sectional view of a drying oven according to an embodiment.

The drying oven 100 according to this embodiment is used as a device for drying the body B in the painting facility. The temperature of the body B housed in an internal space S of the drying oven 100 is increased by blowing hot air into the internal space S from the hot air nozzles 1, thus drying paint applied to the body B (FIG. 1). The body B is conveyed by a conveyor 120 and moves in the lengthwise direction (X-axis direction in FIG. 1) of the internal space S in the drying oven 100.

Configuration of Hot Air Nozzle

Figure 2:
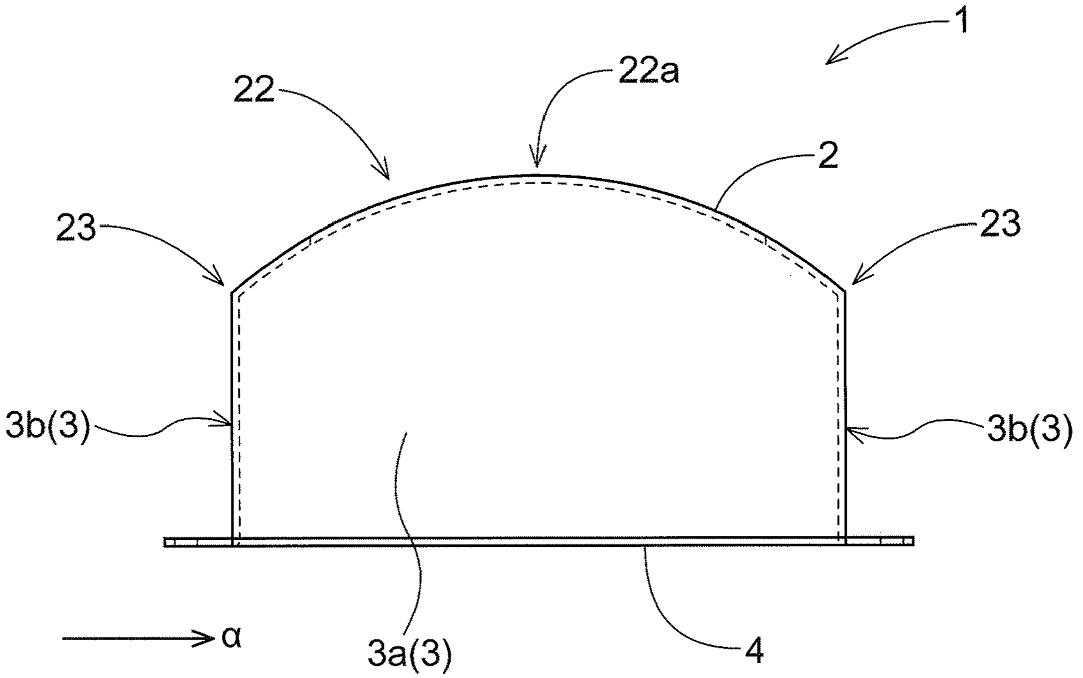
FIG. 2 is a front view of a hot air nozzle according to the embodiment.
Figure 3:
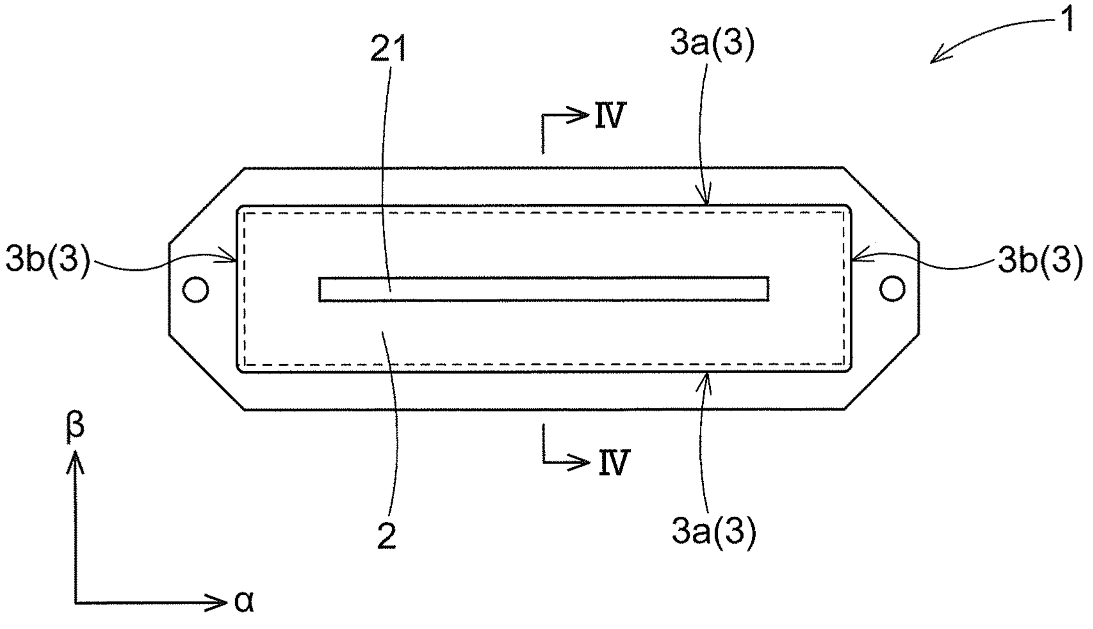
FIG. 3 is a top view of the hot air nozzle according to the embodiment.
Figure 4:
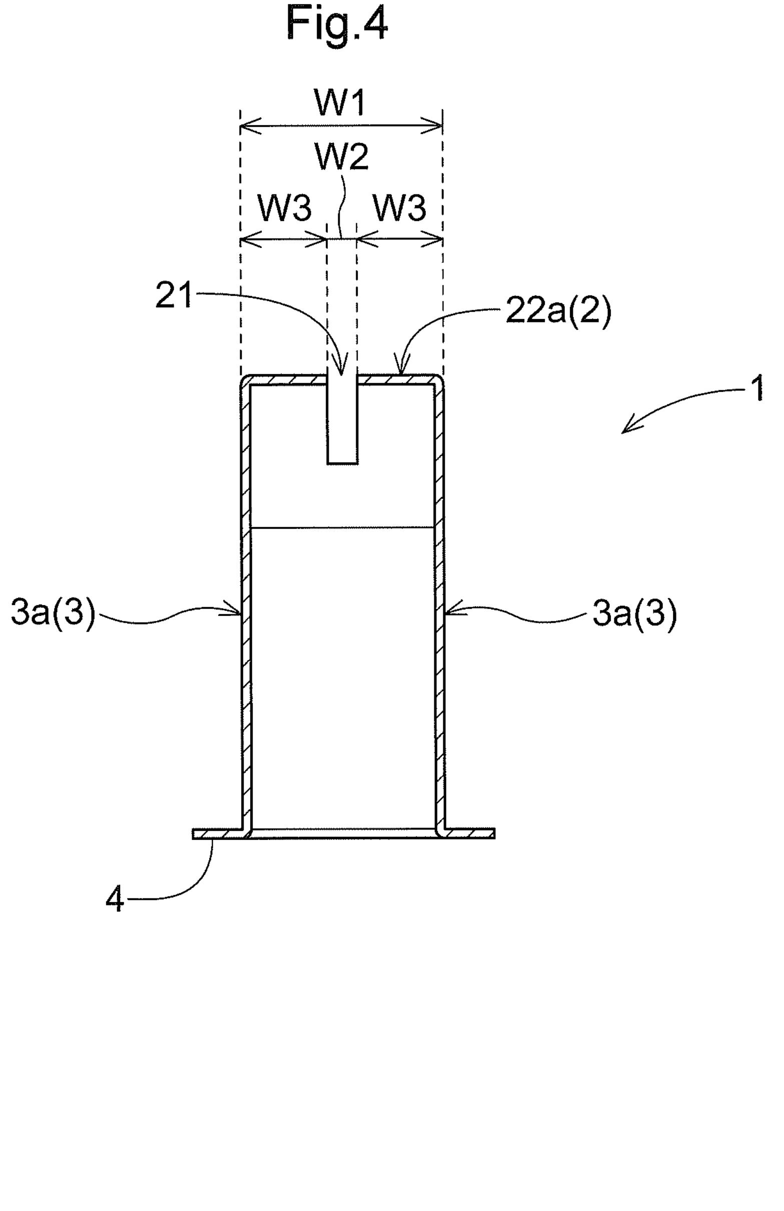
FIG. 4 is a cross-sectional view taken along an IV-IV line in FIG. 3.

The hot air nozzle 1 according to this embodiment includes a leading-end face 2 having an outlet 21, and side faces 3 extending between the leading-end face 2 and a base end 4 (FIGS. 2 to 4). The hot air nozzle 1 of this embodiment extends from a wall face (inclined face 114) of the drying oven 100 toward the internal space S, and the base end 4 is disposed on the wall face. The base end 4 is connected to an air supply duct.

The leading-end face 2 is rectangular in a top view (FIG. 3). A lengthwise direction α and a widthwise direction β of the leading-end face 2 are thus distinguishable. The side faces 3 include side faces 3*a* corresponding to the long sides (lengthwise direction α) of the leading-end face 2, and side faces 3*b* corresponding to the short sides (widthwise direction β) of the leading-end face 2. The side faces 3*a* and the side faces 3*b* are distinguishable.

The leading-end face 2 has a center section 22 in the lengthwise direction α that protrudes relative to end sections 23 located at the two opposite ends in the lengthwise direction α (FIG. 2). More specifically, the leading-end face 2 is a curved face that is continuously curved between the end sections 23 on the two opposite sides. The leading-end face 2 of this embodiment has a curved shape that corresponds to an arc of a fan shape with a radius of 97 mm and a central angle of 84°. The center section 22 has a top 22*a* that protrudes by 25 mm relative to the end sections 23.

The leading-end face 2 of this embodiment has a width W1 of 35 mm in a cross-section (FIG. 4) taken along the widthwise direction β. The leading-end face 2 having the width W1 that is 20 mm or more and 50 mm or less, as in this example, makes it easy for the hot air nozzle 1 to sufficiently serve as a pressure header. Particularly, the width W1 of the leading-end face 2 being sufficiently larger than a later-described width W2 of the outlet 21 makes the air velocity of hot air discharged from the hot air nozzle 1 more likely to be uniform. Note that the favorable range of the width W1 of the leading-end face 2 has an upper limit, as mentioned above, since there are cases where an excessively large width W1 impairs the inducing effect.

The outlet 21 is provided as a rectangular slit that is open along the lengthwise direction a at the center of the leading-end face 2 in the widthwise direction β (FIGS. 2 to 4). The width W2 of the outlet 21 of this embodiment is 5 mm in the cross-section (FIG. 4) taken along the widthwise direction β, and is 14% of the width W1 (35 mm) of the leading-end face 2.

The width W2 of the outlet 21 being 5 mm or more, as in this example, is favorable since a sufficiently large opening of the outlet 21 can be secured and the pressure loss of discharged hot air (heated air) can be suppressed. Also, the width W2 of the outlet 21 being 20 mm or less is favorable since the air velocity of discharged hot air is more likely to reach a level (e.g., 15 to 25 m per second) at which the hot air has a sufficient air-inducing effect.

The leading-end face 2 of this embodiment has two solid sections on opposite sides thereof that sandwich the outlet 21 in the cross-section (FIG. 4) taken along the widthwise direction ß, and each solid section has a width W3 of 15 mm. Thus securing a width W3 of 5 mm or more for each solid section adjacent to the outlet 21 is favorable since vortices are more likely to occur around the outlet 21, thereby promoting stirring of surrounding air. From this viewpoint, it is favorable that these solid sections are perpendicular to the direction in which hot air is discharged, and it is, accordingly, favorable that the leading-end face 2 is perpendicular to the side faces 3. Note that the widths of the solid sections of the leading-end face 2 that sandwich the outlet 21 need not be equal on the two opposite sides of the outlet.

Note that the outlet 21 extends along the protruding (curved) shape of the leading-end face 2. The outlet 21 of this embodiment has a length L of 100 mm along the curved face of the leading-end face 2. The outlet 21 extending along the protruding (curved) shape of the leading-end face 2 allows hot air discharged from the outlet 21 to be discharged in not only a straight direction parallel to the extension direction of the hot air nozzle, but also directions deviating leftward and rightward from the straight direction. In other words, the hot air nozzle 1 according to this embodiment can radially discharge hot air relative to the lengthwise direction α. The presence of the solid sections of the leading-end face 2 that sandwich the outlet 21 in the cross-section taken along the lengthwise direction α is favorable since hot air is particularly more likely to be discharged radially.

Configuration of Drying Oven

The drying oven 100 includes a booth 110, a conveyor 120 (an example of a support section) capable of supporting a body B (an example of a workpiece), and a plurality of hot air nozzles 1 (FIG. 1).

The booth 110 has a bottom face 111 that demarcates a bottom section of the booth 110, two side wall faces 112 that demarcate side faces of the booth 110, a top face 113 that demarcates a top face of the booth 110, and two inclined faces 114 extending between the bottom face 111 and the side wall faces 112. The inclined faces 114 are inclined by 45° relative to the horizontal direction (XY plane direction in FIG. 1). The bottom face 111, the side wall faces 112, the top face 113, and the inclined faces 114 demarcate a tunnel-shaped internal space S within the booth 110.

The conveyor 120 extends upward from the bottom face 111, and is configured to support the body B and convey the body B in the lengthwise direction (X-axis direction in FIG. 1) of the internal space S.

Figure 5:
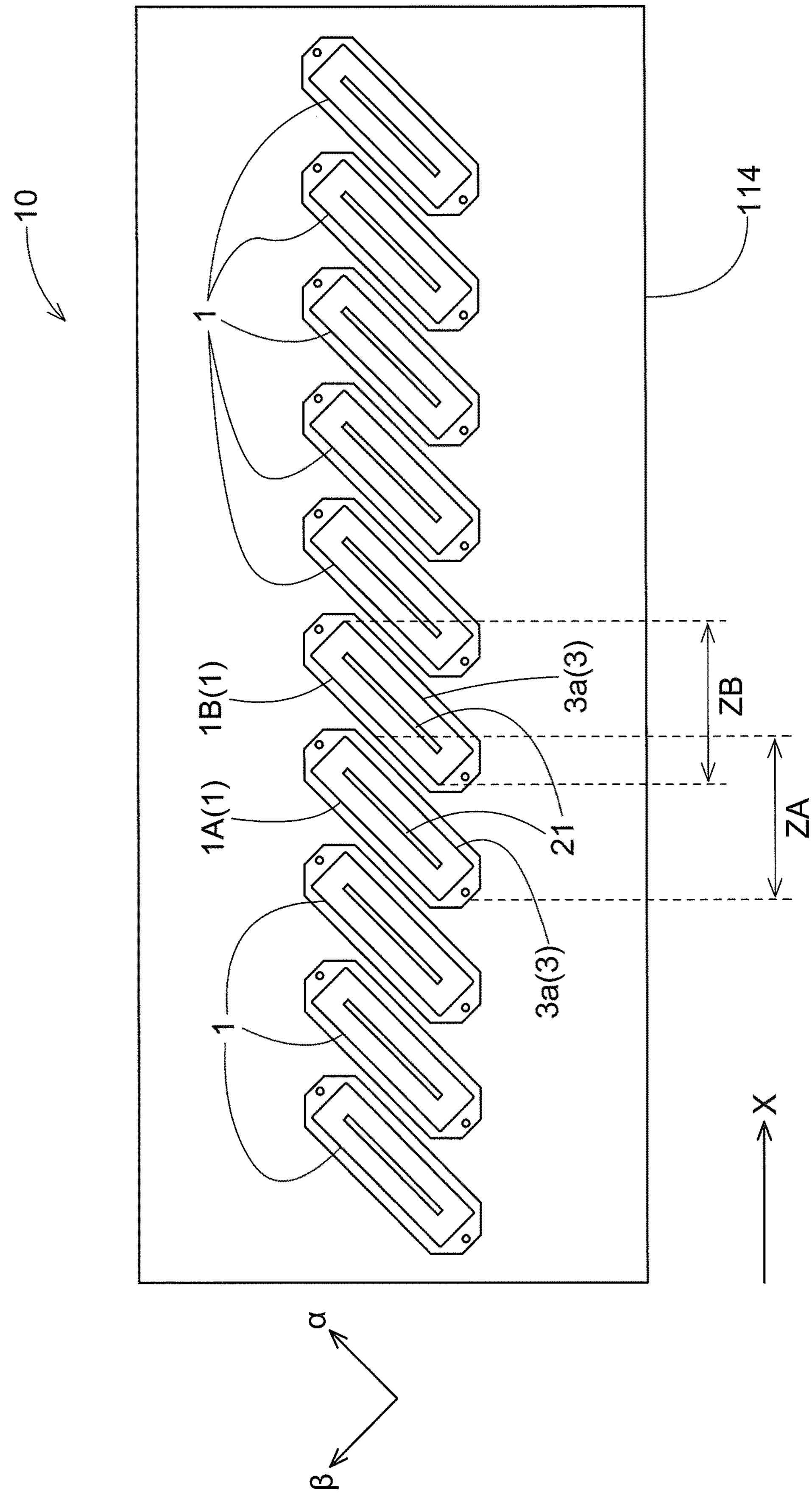
FIG. 5 is a top view of a nozzle row according to the embodiment.

The plurality of (ten in this embodiment) hot air nozzles 1 are in nozzle rows 10 in which the hot air nozzles 1 are in straight lines (FIG. 5). Adjacent hot air nozzles 1 in each nozzle row 10 are apart from each other with their side faces 3*a* (corresponding to the long sides of the leading-end face 2) opposing each other.

Figure 6:
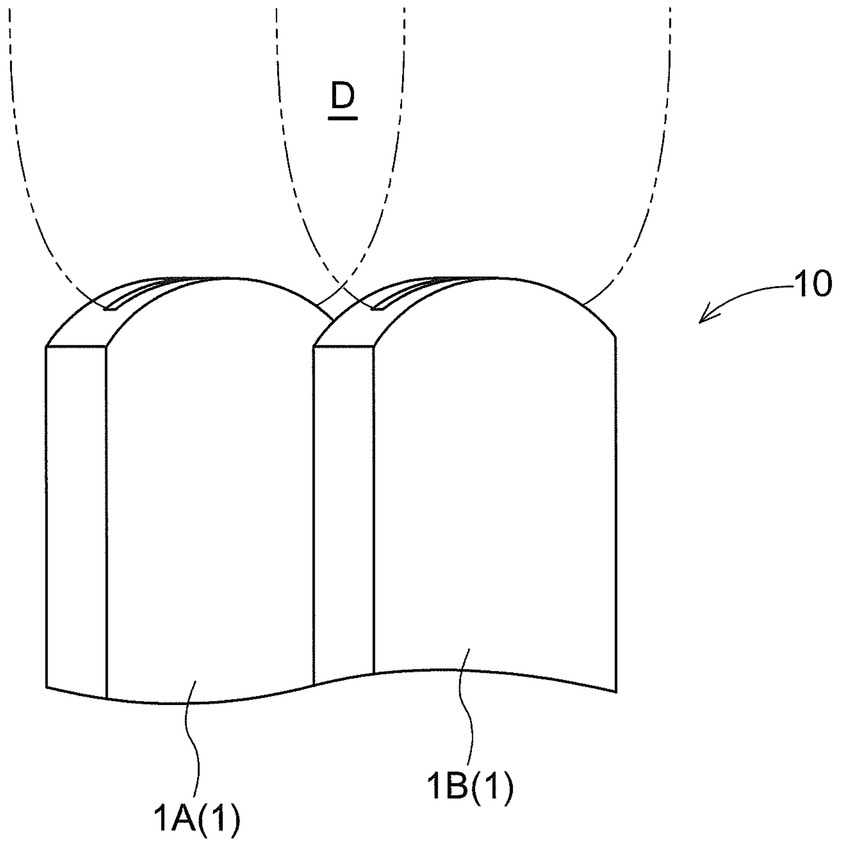
FIG. 6 is a schematic view showing a distribution of hot air discharged from the nozzle row according to the embodiment.

The extension direction of the nozzle rows 10 is parallel to the lengthwise direction of the inclined faces 114 (X-axis direction in FIG. 1). The plurality of hot air nozzles 1 are such that the lengthwise direction α of each hot air nozzle 1 and the extension direction of the nozzle row 10 to which this hot air nozzle 1 belongs (X-axis direction in FIG. 1) form an angle of 45°. Here, an area ZA where a certain hot air nozzle 1A is present in the extension direction of the nozzle row 10 partially overlaps an area ZB where a hot air nozzle 1B adjacent to the hot air nozzle 1A is present in the extension direction (FIG. 5). This generates an overlapping area D of hot air discharged from two adjacent hot air nozzles 1, thus allowing the body B to be continuously exposed to hot air discharged from the hot air nozzles 1 while the body B is conveyed in the lengthwise direction of the internal space S (FIG. 6). It is thus favorable that an angle formed between the lengthwise direction α of each hot air nozzle 1 and the extension direction of the nozzle row 10 to which this hot air nozzle 1 belongs is more than 0° and less than 90°.

Each hot air nozzle 1 extends perpendicularly from the corresponding inclined face 114 toward the internal space S. The inclined face 114 is inclined by 45° relative to the horizontal direction (XY plane direction in FIG. 1), and therefore, each hot air nozzle 1 is inclined by 45° relative to the horizontal direction. Hot air discharged from the hot air nozzle 1 hits the body B supported by the conveyor 120, obliquely from below relative to the body B. One nozzle row 10 is provided on each of the two inclined faces 114, thus allowing the body B to be exposed to hot air obliquely from below on both left and right sides. There are cases where the temperature is unlikely to increase in a lower section (a vehicle bottom, a lower section of a door etc.) of the body B. However, this configuration allows the lower part to be intensively exposed to hot air, and makes it easier to increase the temperature in the lower section.

Variation of Drying Oven

A drying oven 100A (FIG. 7) according to a variation includes baffles 115 (115A, 115B, 115C), which extend inward of the booth 110. Of these, the baffle 115A extends downward from the top face 113, and the baffles 115B and 115C extend upward from the bottom face 111. The extension length of the baffle 115A is 350 mm, and the extension lengths of the baffles 115B and 115C are 250 mm.

Figure 7:
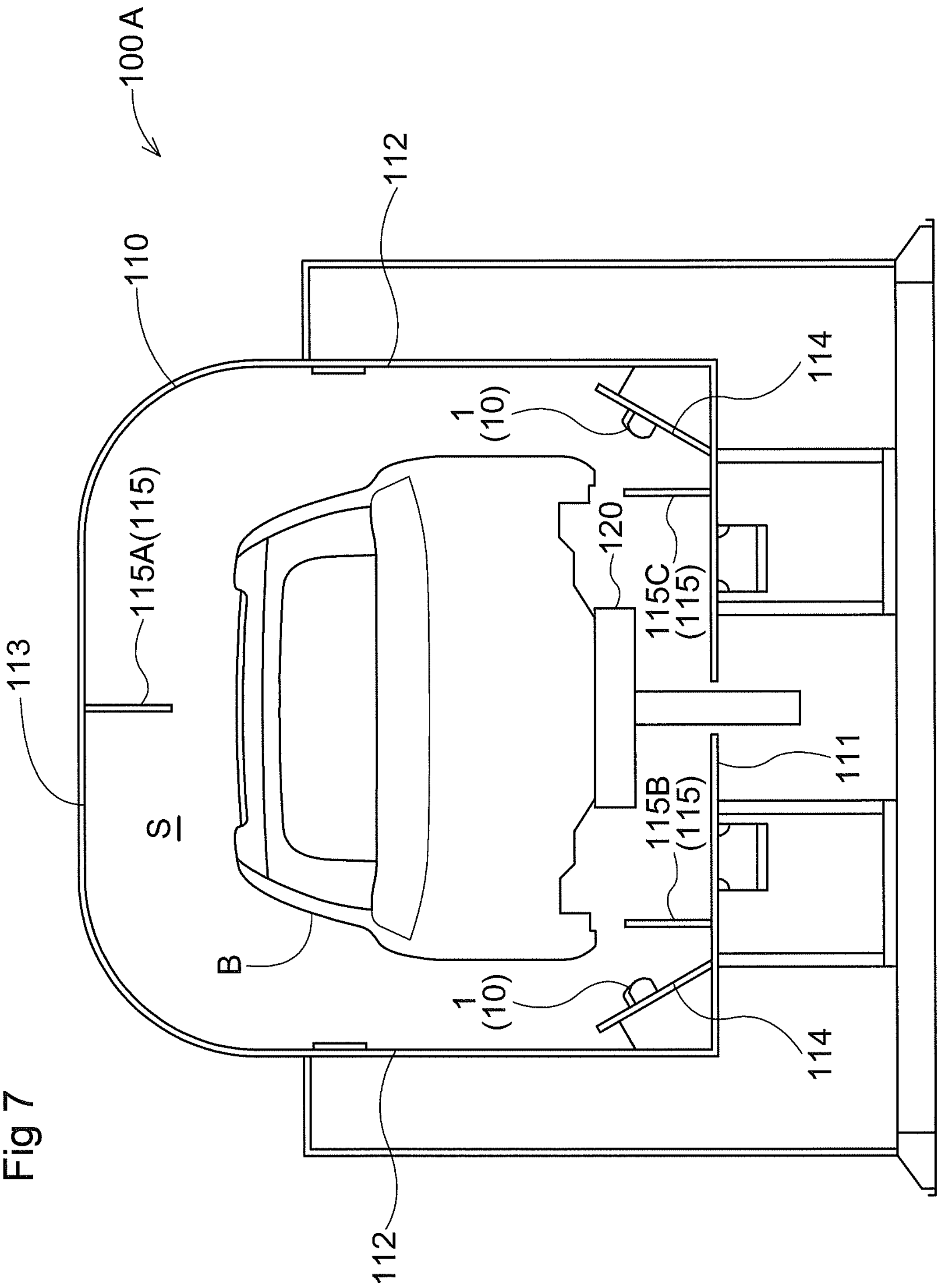
FIG. 7 is a cross-sectional view of a drying oven according to a variation.

There are cases where a swirling flow (an air flow moving in a clockwise or counterclockwise direction in a YZ plane in FIG. 7) occurs in the internal space S as a result of hot air being discharged from the hot air nozzles 1. If a swirling flow occurs, the swirling flow sweeps hot air, and there is a possibility that the body B will not be exposed to hot air in an intended manner, resulting in variation in the temperature of the body B. In this variation, the baffles 115 are installed to interrupt an air flow moving in a direction of a cross-section (YZ plane in FIG. 7) of the internal space S and prevent a swirling flow.

In the case of installing the baffles 115, the baffles 115 (115A, 115B, 115C) need not be installed at three locations as in this variation, and need only interrupt the air flow at at least one location in a cross-section (YZ plane in FIG. 7) of the internal space S. For example, only the baffle 115A that extends from the top face 113 may be provided at one location.

Other Embodiments

Lastly, other embodiments of the hot air nozzle and the drying oven according to the present invention will be described. Note that the configuration disclosed in each of the following embodiments can also be combined with the configurations disclosed in the other embodiments for implementation as long as no contradiction arises.

The above embodiment described, as an example, a configuration where the leading-end face 2 is a curved face that is continuously curved between the end sections 23 on the two opposite sides. However, the leading-end face according to the present invention is not limited to a curved face as long as its center section in the lengthwise direction protrudes relative to the two ends in the lengthwise direction. For example, the leading-end face may be a combination of a plurality of flat faces. In this case, the shape of the leading-end face in a front view (the shape of the leading-end face from a viewpoint corresponding to FIG. 2) can be a part of a polygon. In this case, it is favorable that the outlet extends over at least one of the vertices of the polygon in order to provide an outlet that extends along the protruding shape of the leading-end face. That is, the outlet need only have a shape with which hot air can be radially discharged relative to the lengthwise direction.

The above embodiment has described, as an example, a configuration where the leading-end face 2 has a rectangular shape in a top view (FIG. 3). However, the shape of the leading-end face of the present invention is not limited thereto as long as the lengthwise direction and the widthwise direction are distinguishable, and can alternatively be, for example, an elliptical or polygonal shape.

The above embodiment has described, as an example, a configuration where the outlet 21 is a rectangular slit.

However, the shape and the positioning of the outlet of the present invention is not limited thereto as long as the outlet extends along the protruding shape of the leading-end face (i.e., has a shape with which hot air can be radially discharged relative to the lengthwise direction). The outlet may alternatively have, for example, an elliptical or polygonal shape, or may have a plurality of small openings in a line along the protruding shape of the leading-end face. In the latter variation, each small opening may have any shape, such as a circular, elliptical, or polygonal shape.

The above embodiment has described, as an example, a configuration where the lengthwise direction α of each hot air nozzle 1 and the extension direction of the nozzle row 10 to which this hot air nozzle 1 belongs (X-axis direction in FIG. 1) form an angle of 45°, and stated that this angle is preferably more than 0° and less than 90°. However, the angle formed by each hot air nozzle and the extension direction of the nozzle row to which this hot air nozzle belongs is not specifically limited in the present invention.

The above embodiment has described, as an example, a configuration where the area ZA where the hot air nozzle 1A is present in the extension direction of the nozzle row 10 partially overlaps the area ZB where the hot air nozzle 1B adjacent to the hot air nozzle 1A is present in the extension direction. However, such overlapping need not necessarily occur in the present invention.

The above embodiment has described, as an example, a configuration where the hot air nozzles 1 (nozzle rows 10) are on the inclined faces 114. However, the locations of the hot air nozzles are not limited in the present invention. In the case of providing the inclined faces 114, the inclination relative to the horizontal direction is not limited to being 45° as in the above example, and can be determined as appropriate, depending on the workpiece. Specifically, consideration can be given to locations of a region of the workpiece that is to be intensively exposed to hot air and a region that is not to be intensively exposed to hot air.

The above embodiment has described, as an example, the drying oven 100 to serve as a device for drying the body B. However, the workpiece to be dried is not limited thereto in the present invention.

The above embodiment has described, as an example, a configuration where the drying oven 100 includes the conveyor 120, and the body B is conveyed by the conveyor 120. However, the drying oven according to the present invention is not limited thereto as long as the support section can support the workpiece. That is, the support section is not limited to being of a movable type, such as the conveyor 120 of the above embodiment, and may alternatively be of a fixed type.

The above embodiment has described, as an example, the drying oven 100 that includes the hot air nozzles 1 according to the above embodiment. However, the hot air nozzles in the drying oven according to the present invention are not limited as long as the hot air nozzles are those according to the present invention. In other words, the present invention can be the use of the hot air nozzles according to the present invention in a drying oven.

As for any other configurations as well, the embodiments disclosed herein are examples in all respects, and it should be understood that the scope of the present invention is not limited thereby. A person skilled in the art would readily understand that the embodiments can be altered as appropriate without departing from the gist of the present invention. Accordingly, other embodiments that are altered without departing from the gist of the present invention are naturally included in the scope of the present invention.

INDUSTRIAL APPLICABILITY

The present invention can be used in, for example, a drying oven for drying a workpiece, and a hot air nozzle to be installed in this drying oven.

DESCRIPTION OF REFERENCE SIGNS

1: Hot air nozzle
2: Leading-end face
21: Outlet
22: Center section of leading-end face
22*a*: Top of center section of leading-end face
23: End section of leading-end face
3: Side face
3*a*: Side face corresponding to long side of leading-end face
3*b*: Side face corresponding to short side of leading-end face
4: Base end
10: Nozzle row
100: Drying oven
110: Booth
111: Bottom face
112: Side wall face
113: Top face
114: Inclined face
115: Baffle
120: Conveyor
B: Body
S: Internal space of drying oven
ZA, ZB: Area where hot air nozzle is present
D: Overlapping area of hot air
α: Lengthwise direction of hot air nozzle
β: Widthwise direction of hot air nozzle

The invention claimed is:

1. A drying oven comprising:
a booth;
a support section configured to support a workpiece; and
a plurality of hot air nozzles, and
wherein:
each of the plurality of hot air nozzles comprises a leading-end face having an outlet, and at least one side face extending between the leading-end face and a base end,
the leading-end face has a shape making a lengthwise direction and a widthwise direction of the leading-end face distinguishable, and has a center section in the lengthwise direction protruding from two opposite ends, in the lengthwise direction, of the leading-end face,
the outlet extends along a protruding shape of the leading-end face,
in a cross-section taken along the widthwise direction, a distance between the two side faces at the leading-end is larger than a width of the outlet,
the plurality of hot air nozzles are in at least one nozzle row in which the plurality of hot air nozzles are in a straight line,
each of the plurality of hot air nozzles is at a position at which the lengthwise direction of the hot air nozzle and an extension direction of the nozzle row to which the hot air nozzle belongs form an angle of more than 0° and less than 90°,
a first hot air nozzle and a second hot air nozzle adjacent to each other in the nozzle row are apart from each other with a side face of the first hot air nozzle extending in the lengthwise direction of the first hot air nozzle and a side face of the second hot air nozzle extending in the lengthwise direction of the second hot air nozzle opposing each other, and an area in which the first hot air nozzle is present in the extension direction of the nozzle row partially overlaps an area in which the second hot air nozzle is present in the extension direction of the nozzle row.

2. The drying oven according to claim 1, wherein the booth has a bottom face demarcating a bottom section of the booth, a side wall face demarcating a side face of the booth, and an inclined face extending between the bottom face and the side wall face, and wherein the plurality of hot air nozzles extend from the inclined face.

3. The drying oven according to claim 1, further comprising:

at least one baffle extending inward of the booth.

4. A drying oven comprising:

a booth;

a support section configured to support a workpiece; and a plurality of hot air nozzles, wherein:

each of the plurality of hot air nozzles comprises a leading-end face having an outlet and being rectangular in a top view, and at least one side face extending between the leading-end face and a base end, the leading-end face has a center section in a lengthwise direction of the leading-end face that protrudes, in a direction in which hot air is discharged, relative to end sections located at two opposite ends in the lengthwise direction, the outlet is provided along the lengthwise direction, the leading-end face has two solid sections that sandwich the outlet in a cross-section taken along a widthwise direction of the leading-end face, the plurality of hot air nozzles are in at least one nozzle row in which the plurality of hot air nozzles are in a straight line, each of the plurality of hot air nozzles is at a position at which the lengthwise direction of the hot air nozzle and an extension direction of a nozzle row to which the hot air nozzle belongs form an angle of more than 0° and less than 90°, a first hot air nozzle and a second hot air nozzle adjacent to each other in the nozzle row are apart from each other with a side face of the first hot air nozzle extending in the lengthwise direction of the first hot air nozzle and a side face of the second hot air nozzle extending in the lengthwise direction of the second hot air nozzle opposing each other, and an area in which the first hot air nozzle is present in the extension direction of the nozzle row partially overlaps an area in which the second hot air nozzle is present in the extension direction of the nozzle row.

5. The drying oven according to claim 4, wherein the booth has a bottom face demarcating a bottom section of the booth, a side wall face demarcating a side face of the booth, and an inclined face extending between the bottom face and the side wall face, and the plurality of hot air nozzles extend from the inclined face.

6. The drying oven according to claim 4 or claim 5, further comprising:

at least one baffle extending inward of the booth.

* * * * *